UNITED STATES PATENT OFFICE.

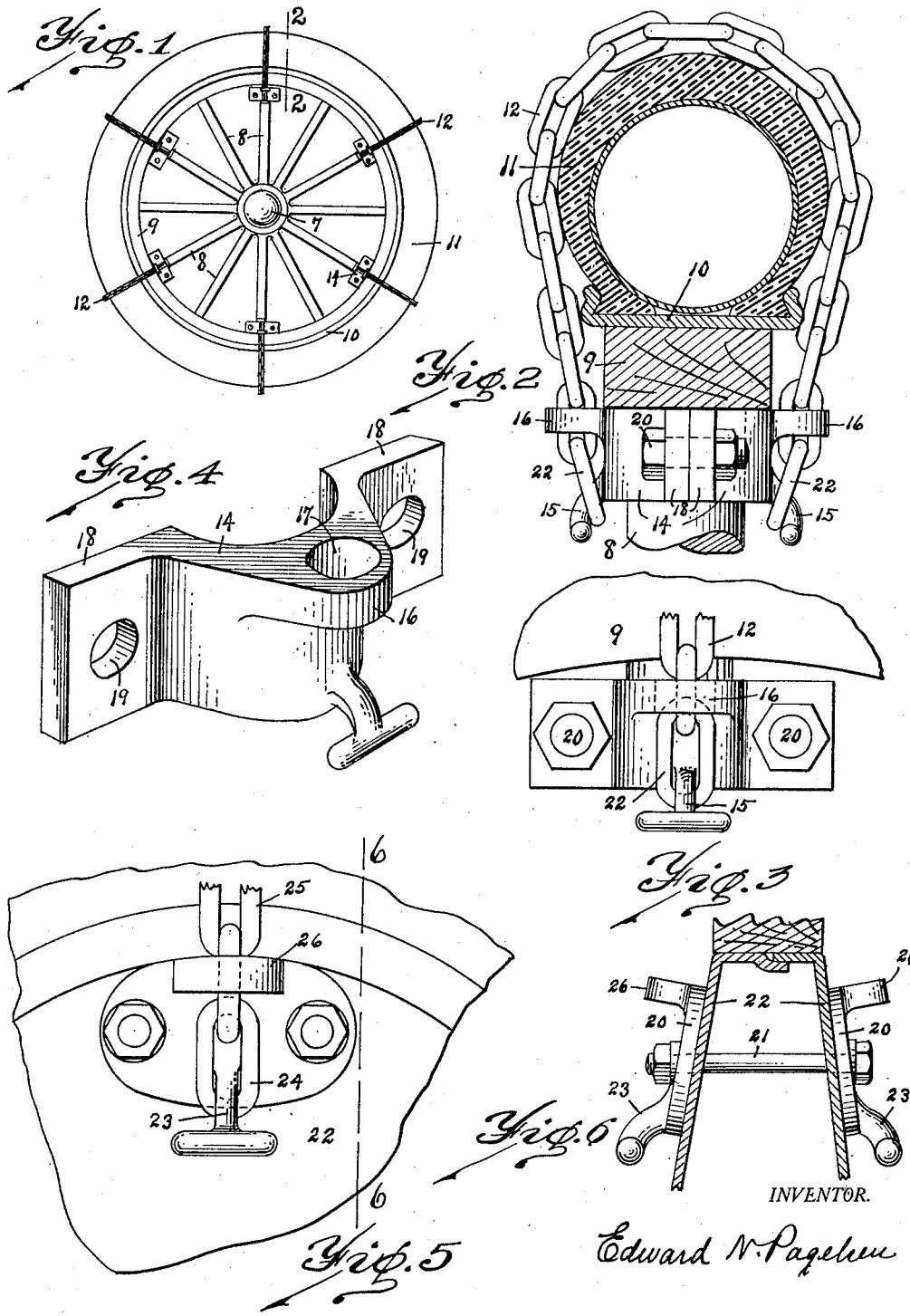

EDWARD N. PAGELSEN, OF DETROIT, MICHIGAN.

NON-SLIP DEVICE FOR VEHICLE-WHEELS.

1,395,354.

Specification of Letters Patent.

Patented Nov. 1, 1921.

Application filed September 15, 1921. Serial No. 500,854.

*To all whom it may concern:*

Be it known that I, EDWARD N. PAGELSEN, a citizen of the United States, and residing at Detroit, in the county of Wayne and State of Michigan, have invented a new and Improved Non-Slip Device for Vehicle-Wheels, of which the following is a specification.

This invention relates to means for attaching non-skid chains to the wheels of vehicles, and its object is to provide an anchoring device of this character which will retain the chain under all conditions, which will have no moving parts, which can be made of any desired strength, and which can be produced at low cost.

This invention consists of a chain attaching anchor embodying a body, a hook to receive the end link of the chain and having an enlarged end, and a perforated lug through which the chain extends from the hook.

It further consists in the details of construction illustrated in the accompanying drawing and particularly pointed out in the claims.

In the drawing, Figure 1 is a side elevation of a wheel of the artillery type provided with non-skid chains attached to my improved anchor. Fig. 2 is a section on the line 2—2 of Fig. 1 on a larger scale. Fig. 3 is a side elevation of my improved anchor. Fig. 4 is a perspective of one of the halves of this anchor. Fig. 5 is a side elevation of a modified form of this anchor. Fig. 6 is a section on the line 6—6 of Fig. 5.

Similar reference characters refer to like parts throughout the several views.

Non-skid chains for trucks and other heavy vehicles are usually attached independently to anchoring devices which are mounted on the spokes or fellies of spoked wheels or are attached to the web plates of disk wheels. It sometimes is desirable to disconnect one end only of each chain, permitting the chain to remain attached to the anchoring device at its other end, so that provisions must be made to prevent entire disengagement of the chain from the anchoring device. The construction shown in the drawing meets this requirement and has the advantage of being adapted for all types and sizes of wheels. This anchor is made in two similar parts, preferably of cast or forged steel, and the sizes of the several parts will be made sufficient to meet the stresses thereon.

In Figs. 1 and 2 I have shown a wheel having a hub 7, spokes 8, felly 9, rim 10 and tire 11. Attached to a number of the spokes are the anchor devices for the non-skid chains 12, each anchor consisting of two similar parts, and each part consisting of the semi-cylindrical body 14 having at one end a hook 15 with an enlarged end, and preferably T shaped, and a lug 16 at the other, the lug having a hole 17 to permit the chain 12 to pass through. The two parts each have flanges 18 provided with holes 19 for the bolts 20 by means of which the two parts may be attached to a spoke 8.

When the chain is passed around the tire on the wheel and through the holes 19, and the two end links 22 are placed over the hooks 15, the slack in the chain will not unhook the end links, even when the chain is uppermost on the wheel, as shown in Fig. 2. The slack of the chain hangs in loops between the tire and the lugs 16 and does not slide down in the holes 17 in the lugs 16. When, however, one end of the chain is loose, the main portion of the chain swings in all directions from the outer end of the hole 17 on the side at which the chain is attached and does not become loose. In fact, there is no more danger of the chain getting lost when only one end is attached to a hook 15 than when both ends are secured. No side pulls come on the hooks as the pull on them is always in alinement with the centers of the holes 16.

The anchoring device is changed a little to adapt it for disk wheels. It is again made in two parts 20, but these are flat and are adapted to be attached to the web plates 22 by means of the bolts 21. Each part 20 has the same hook 23 for the end link 24 of the tire chain 25 and the perforated lug 26 through which the chain is passed and which receives the heavy side pulls of the chain.

The possibilities of the slack of the chain permitting the end links 24 to unhook are so remote that they may be disregarded.

The details of construction may all be changed by those skilled in the art to adapt this anchoring device to wheels of different types without departing from the spirit of my invention as set forth in the following claims.

I claim:—

1. An anchoring device for tire chains comprising two similar parts adapted to be secured to a vehicle wheel, each part having a perforated lug through which a chain may pass and a hook on which the chain may be suspended.

2. A new article of manufacture consisting of a metal body having holes for bolts by means of which it may be attached to a vehicle wheel, said body having a lug on one side provided with a hole to permit a tire chain to pass through and also having a hook adjacent said hole to receive the tire chain, said hook having an enlarged end to prevent ready removal of the chain.

3. An anchoring device for tire chains comprising two similar parts adapted to be secured to a vehicle wheel spoke, each part having a semi-cylindrical body and lateral flanges formed with holes, and bolts extending through the holes in the flanges to attach said parts to the vehicle spoke, said parts each having a lug at its edge toward the outer end of the spoke and the lugs having holes parallel to the spoke through which holes tire chains are adapted to be passed, said parts also having T shaped hooks opposite said holes to receive the ends of said chains.

EDWARD N. PAGELSEN.